United States Patent [19]

Herbert et al.

[11] 4,236,737
[45] Dec. 2, 1980

[54] CONDUIT SWIVEL JOINT

[75] Inventors: John T. Herbert, Horton; Larry R. Nixon, Michigan Center, both of Mich.

[73] Assignee: Aeroquip Corporation, Jackson, Mich.

[21] Appl. No.: 946,707

[22] Filed: Sep. 28, 1978

[51] Int. Cl.³ .................. F16D 3/12; F16L 19/04; F16L 21/00; F16L 27/00
[52] U.S. Cl. ................................. 285/234; 285/281; 64/27 NM
[58] Field of Search ............... 285/272, 278, 279, 280, 285/281, 282, 223, 114, 116, 231, 233, 234, 168; 403/226, 227, 228; 64/14, 27 NM, DIG. 2

[56] References Cited
U.S. PATENT DOCUMENTS

| 1,586,725 | 6/1926 | Westinghouse et al. | 285/279 |
|---|---|---|---|
| 1,995,109 | 3/1935 | Smittle | 285/279 X |
| 2,036,537 | 4/1936 | Otis | 285/281 X |
| 2,390,892 | 12/1945 | McCormack | 285/279 X |
| 2,407,745 | 9/1946 | Jacobsen | 285/278 |
| 2,556,624 | 6/1951 | Macbeth | 64/27 NM X |
| 2,709,903 | 6/1955 | Hallewell | 64/27 NM |
| 3,201,152 | 8/1965 | Coats | 285/281 X |
| 3,252,301 | 5/1966 | Herrington | 64/27 NM |
| 3,501,174 | 3/1970 | Walker | 285/279 |
| 3,504,903 | 4/1970 | Irwin | 285/223 X |
| 3,680,895 | 8/1972 | Herbert et al. | 285/261 X |
| 3,734,546 | 5/1973 | Herbert et al. | 285/234 X |
| 3,801,142 | 4/1974 | Jones et al. | 285/280 |
| 3,834,181 | 9/1974 | Strasburg et al. | 64/27 NM |
| 4,068,864 | 1/1978 | Herbert et al. | 285/234 X |
| 4,141,664 | 2/1979 | Moran et al. | 403/228 X |

FOREIGN PATENT DOCUMENTS

| 1000961 | 12/1976 | Canada | 64/27 NM |
|---|---|---|---|
| 2353914 | 5/1975 | Fed. Rep. of Germany | 285/231 |
| 978461 | 12/1964 | United Kingdom | 285/281 |
| 1371352 | 10/1974 | United Kingdom | 285/281 |

Primary Examiner—Roy D. Frazier
Assistant Examiner—Carl F. Pietruska
Attorney, Agent, or Firm—Beaman & Beaman

[57] ABSTRACT

The invention pertains to high pressure conduit swivel joints capable of conducting fluid pressures of 6,000 psi wherein the associated conduit members of the joint are permitted angular deflection and relative rotational movement. An elastomer assembly is interposed between the conduit associated members of the joint permitting limited relative rotational movement solely due to elastic deformation, and greater rotative movement produces bearing supported rotation of the members. A tubular sleeve is mounted upon a body, and a retainer attached to the body maintains the sleeve thereon, and the elastomer assembly is compressed by the retainer which controls the torque requirements for producing bearing rotative support of the members, such bearing supported rotation occuring at greater torque conditions than that necessary to produce limited member rotation due to elastomer deformation.

10 Claims, 4 Drawing Figures

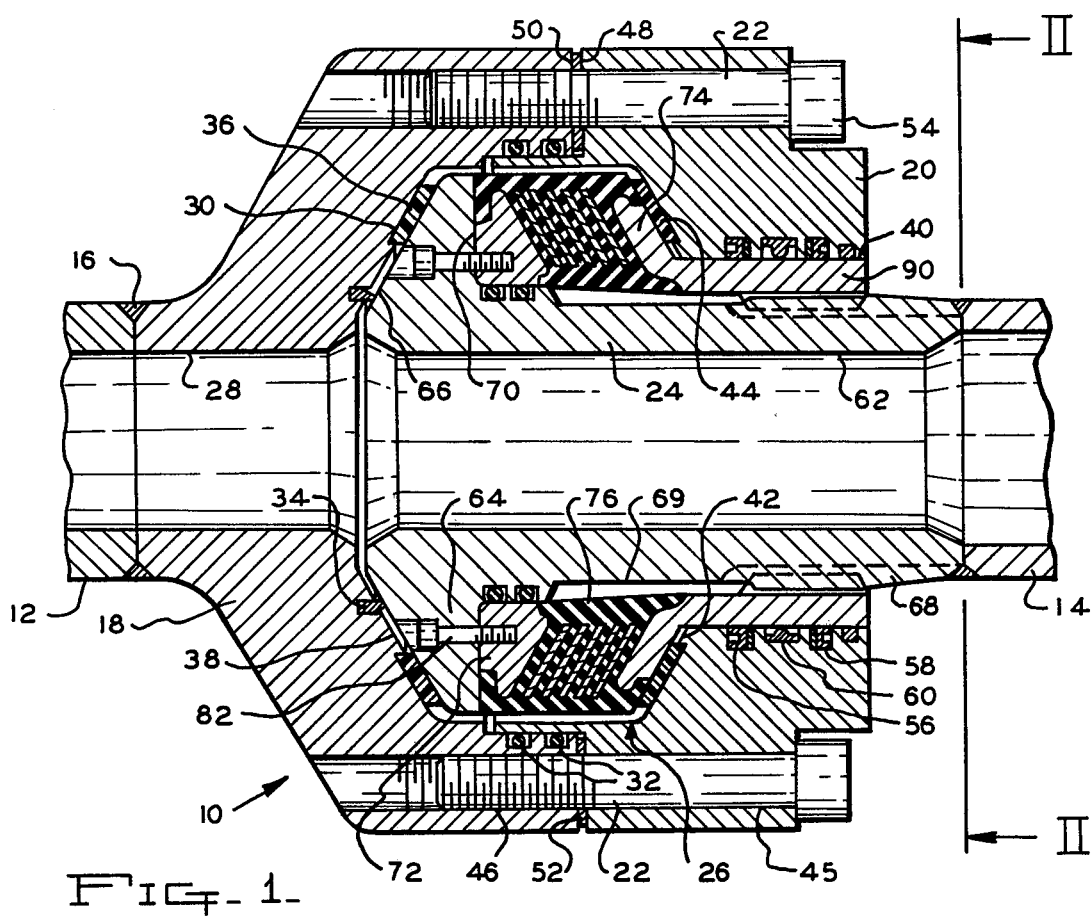
Fig-1-
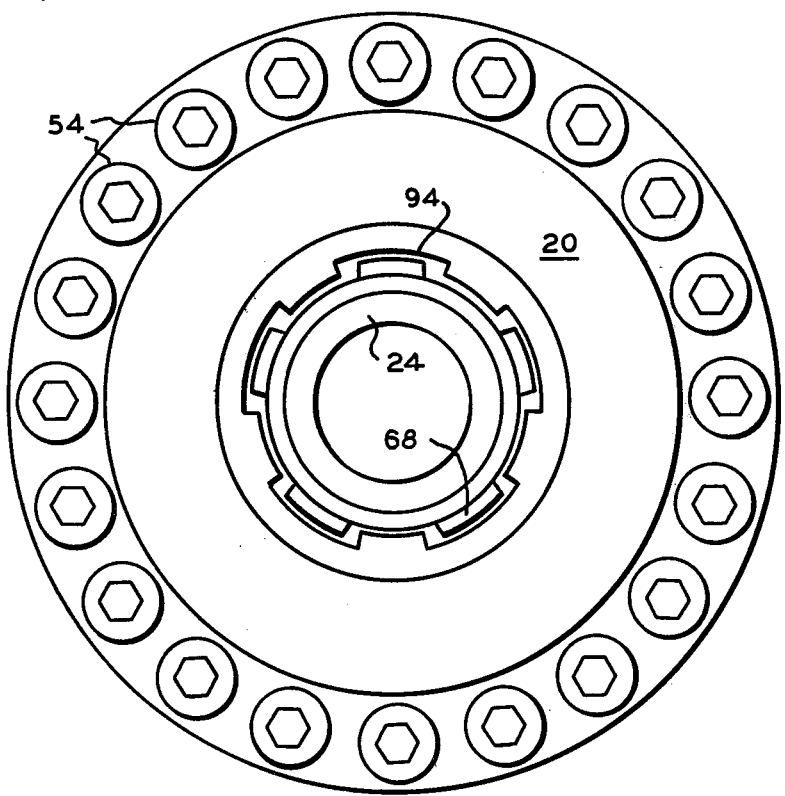
Fig-2-

4,236,737

CONDUIT SWIVEL JOINT

SUMMARY OF THE INVENTION

The invention pertains to a swivel joint for incorporation into a high pressure rigid conduit system wherein the joint permits limited angular conduit deformation, and relative rotative movement, between conduits.

Swivel joints are utilized in rigid conduit systems wherein conduits connected in end-to-end relationship require reltive conduit movement either in an angular or rotative manner and where the integrity of the conduit system is to be preserved during such deformation. In the past, swivel joints have incorporated ball and socket arrangements, elastomeric seals, rotative seals and other mechanical devices which permit the interconnected conduits limited relative movement. Typical examples of patented conduit joints are shown in my U.S. Pat. Nos. 3,390,899; 3,680,895; 3,734,546 and 3,853,337.

In the installation of offshore oil and gas drilling installations rigid conduits are used to extend between the drilling platform and the submerged wellhead, and swivel joints are often used in such systems to accommodate misalignments, water current effects, torque forces, and other factors imposing stress upon the conduit systems. As such joints are often located at hundreds of feet below the water surface the exterior of the joint is subjected to very high fluid pressure, while the joint interiors communicating with a well, may also be subjected to very high pressures as high as 6,000 psi.

Swivel joints presently available for use under such adverse conditions have not proven as dependable and rugged as desired. It will be appreciated that a swivel joint located several hundred feet below the water surface must have very high reliability characteristics under adverse operating conditions, and it is an object of the invention to provide a conduit swivel joint capable of meeting the prerequisites of such applications.

It is another object of the invention to provide a conduit swivel joint for use in high pressure rigid conduit systems wherein the joint is capable of maintaining its fluid integrity with respect to both internal and external pressures under limited angular associated conduit deflection, and under associated conduit rotative forces.

Another object of the invention is to provide a conduit swivel joint utilizing elastomeric assembled components wherein initial relative conduit rotative forces are absorbed within an elastomer, and where greater relative rotative forces are absorbed in rotative bearing structure.

A further object of the invention is to provide a conduit swivel joint utilizing an elastomeric bearing wherein initial torque forces between associated conduits deform the elastomer while higher torque forces rotate the entire bearing structure.

Another object of the invention is to provide a conduit swivel joint utilizing thrust bearings and sealing means wherein failure of the thrust bearings will not affect sealing characteristics of the joint, and wherein redundant seals are utilized for sealing against internal and external fluid pressures.

In the practice of the invention a body affixed to a fluid conduit supports a tubular sleeve to which another conduit is attached. The sleeve is supported upon an annular elastomeric bearing assembly, and an annular retainer adjustably mounted upon the body frictionally maintains the sleeve and bearing assembly assembled to the body. A lost motion splined relationship between the sleeve and elastomeric bearing permits initial torque forces imposed upon the sleeve to deform the elastomer without rotating the bearing assembly upon thrust bearings mounted upon the body and retainer. However, major rotational deflection of the sleeve relative to the bearing will produce a positive rotation of the entire bearing assembly upon its thrust bearings to prevent overstressing of the elastomer.

The elastomeric bearing uses a plurality of annular conical rings or washers embedded into the elastomer material which aids in keeping the elastomer centered with respect to the axis of joint rotation, and such conical rings add a stiffness to the elastomer relative to axial angular deformation while aiding the torsion absorbing characteristics of the elastomer.

BRIEF DESCRIPTION OF THE DRAWINGS

The aforementioned objects and advantages will be appreciated from the following description and accompanying drawings wherein:

FIG. 1 is a diametrical, sectional, elevational view of a conduit swivel joint in accord with the invention, FIG. 2 is an elevational, sectional view as taken along Section II—II of FIG. 1.

Figure 3:
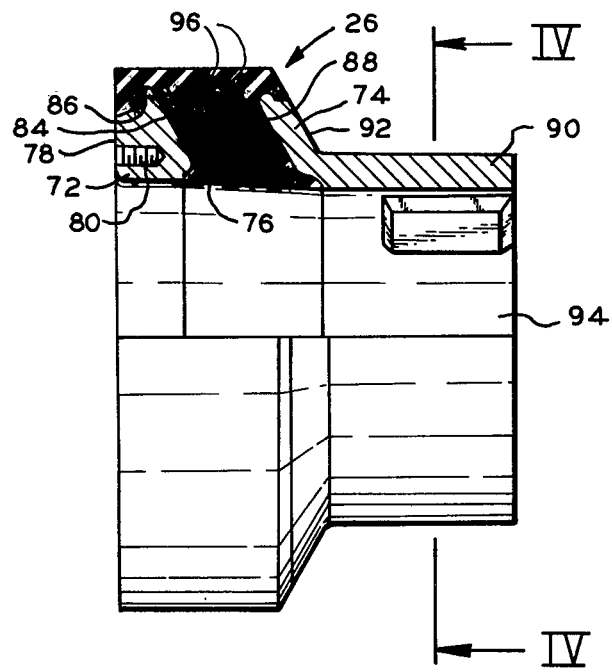
FIG. 3 is an elevational view of the elastomer bearing assembly, per se, the upper half being shown in section.
Figure 4:
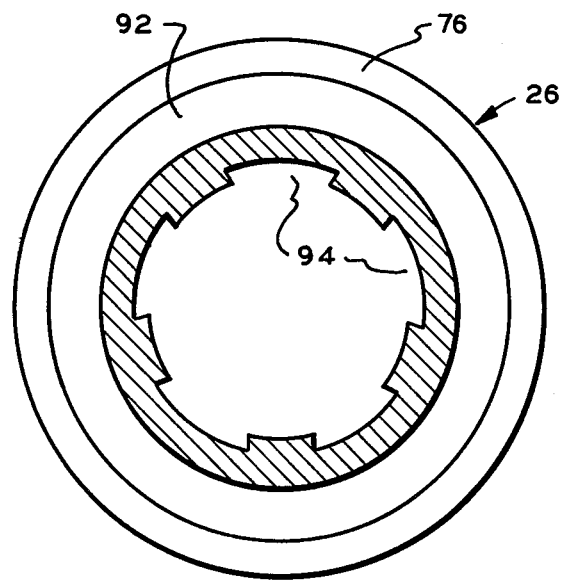
FIG. 4 is an elevational sectional view of the bearing assembly as taken along Section IV—IV of FIG. 3.

DESCRIPTION OF THE PREFERRED EMBODIMENT.

With reference to FIG. 1, the general relationship of the major components of a conduit swivel joint in accord with the invention will be understood. The swivel joint is generally indicated at 10, and is usually installed by being interposed between a pair of rigid conduits, represented at 12 and 14. The conduits are attached to the joint by weld beads 16. The joint includes a body 18 to which an annular retainer 20 is mounted by a plurality of threaded bolts 22. A tubular sleeve 24 is maintained within the body by the retainer 20, and the elastomeric bearing assembly is generally indicated at 26. The conduit 12 is attached to the body 18, while the conduit 14 is welded to the free end of the sleeve 24 as will be appreciated from FIG. 1.

The body 18 is provided with a bore 28, concentric and communicating with the bore of conduit 12, which opens into a recess 30. The recess 30 includes a pair of O-ring seals 32, and an annular wiper ring 34 for cooperation with other joint components as will be later noted. An annular conical thrust bearing 36 is mounted upon the recess surface 38, and this thrust bearing is in axial opposed relationship to a similar thrust bearing mounted upon retainer 20.

The retainer 20 is also of an annular configuration including an inner opening 40, an oblique radially extending surface 42 upon which thrust bearing 44 is mounted, and the retainer includes an axially extending lip which is sealingly engaged by O-rings 32, FIG. 1. The threaded bolts 22 extend through openings 45 defined in the retainer for threaded engagement with threaded bores 46 defined in body 18, and a shoulder 48 defined upon the retainer is in spaced opposed axial relationship to a body defined shoulder 50 separated by a preload washer or spacer 52. The preload bolts 22 are provided with heads 54 and are preferably of the Allen socket type.

The bearings 36 and 44 maybe of the glass filled Teflon type, and the retainer 20 is provided with a plurality of annular grooves intersecting the cylindrical opening 40 in which annular lip seals 56 and 58 are located, as is the elastomeric seal 60.

The sleeve 24 is of a tubular configuration having an internal bore 62 substantially identical to that of body bore 28, or slightly smaller, and the sleeve includes an integral radially extending flange 64 having a conical bearing surface 66 which is engaged by the bearing 36 and the ring 34, FIG. 1. The nose of the sleeve is provided with a plurality of circumferentially spaced spline projections 68, FIGS. 1 and 2, and the central region of the exterior surface of the sleeve is formed with a cylindrical surface 69, while the flange 64 includes the flat radial surface 70 for engagement by the elastomer bearing assembly 26, as will be described.

The annular elastomer bearing assembly construction will be appreciated from FIGS. 1 and 3. This assembly includes a first annular collar 72 in spaced axial relationship to a second collar 74, and an elastomeric material 76, such as rubber, neoprene, urethane, or the like, is bonded to the collars 72 and 74. The collar 72 includes a flat radial surface 78 for engaging the sleeve flange surface 70, and the threaded bore 80 permits a plurality of screws 82 extending through axial openings defined in the flange 64 to affix the collar to the flange. The collar 72 includes an obliquely disposed radially extending surface 84, and convex surface 86 for aiding in the bonding and assembly with the elastomeric material.

The collar 74 includes an obliquely disposed surface 88 in axial opposed relationship to the surface 84, and this collar also includes a cylindrical, axially extending tubular extension 90 closely received within the retainer opening 40. The external surface of the extension 90 is sealingly engaged by the seals 56, 58 and 60, and the collar includes a bearing surface 92 engaging the thrust bearing 44, FIG. 1.

Internally, the extension 90 includes a plurality of spline recesses 94, and from FIG. 2 it will be appreciated that the circumferential dimension of the spline recesses 94 is significantly less than the circumferential dimension of the spline projections 68 defined on the sleeve 24, thus, a lost motion exists between the sleeve 24 and the extension 90 with respect to rotational displacement between the sleeve and extension.

A plurality of conical rings 96 are embedded in the elastomer material 76 intermediate the collars 72 and 74, and the rings are in spaced relationship wherein elastic material is located therebetween. These washers aid in stiffening the elastic bearing assembly with respect to angular deflection of the conduits 12 and 14, and also aids in keeping the elastic material 76 centered during rotational deformation thereof.

The bearing unit 26 will be fabricated separately from the sleeve 24 in molding equipment capable of injecting and forming the elastomeric material about the collars 72 and 74 and the bearing assembly is bolted to the sleeve flange 64 by screws 82. The bearing assembly 26 and the flange 64 together constitute bearing support structure for the sleeve 24, and the sleeve is maintained within the body 10 by the retainer 20.

It will be appreciated that as the bolts 22 mounting the retainer upon the body are tightened the axial dimension between the thrust bearings 36 and 44 decreases, which imposes a frictional force upon the flange 64 and collar 74. The final value of this frictional force will depend upon the spacing between the shoulders 48 and 50 as determined by the preload spacers 52, and by utilizing spacers of various thickness the degree of preloading on the bearing assembly can be accurately regulated. Of course, due to the resilient nature of the material 76 the preloading of the thrust bearings against the bearing assembly will cause some radial outward deformation of the elastomer, and the extent of preloading is such as to insure that the maximum rotational deformation permitted occurs within the elastic material prior to the sleeve rotating upon the bearings 36 and 44 relative to the body and retainer.

In use, the joint 10 interconnects the conduits 12 and 14, and fluid within the conduits will not escape in view of the sealed and assembled relationships between the body 18, retainer 20 and sleeve 24. For instance, in the event of failure of the bearings 36 or 44 the seal 56 will prevent the escape of fluid from the joint, and the seal 58 will prevent fluid from leaking into the joint in the event the joint is located many hundreds of feet below the water surface. The seal 60 aids in sealing the joint against fluid leakage internally or externally.

A radial clearance exists between the sleeve 24 and the collar extension 90, which permits limited angular deviation of the conduits 12 and 14 with respect to each other, and resiliency provided by the elastic material 76 permits such angular deviation.

When the conduits 12 and 14 are subjected to relative rotational torque forces such torque forces will cause the spline projections 68 to rotate within the extension recesses 94, and due to the lost motion provided by the dimensional characteristics of this spline relationship such rotational forces will cause a twisting or deformation within the elastic material 76 through collar 72 which provides a biasing force counter to the torque forces resisting such torque forces without imposing destructive stresses upon the joint. Relative rotational displacement about the axis of the conduits up to approximately 20° is possible solely through deformation within the elastic material 76.

If more than a 20° rotational displacement between the conduits 12 and 14 occurs the projections 68 will engage the side of the recesses 94 producing a positive engagement between the sleeve and extension which will rotate the extension 90 and collar 74. At such occurrence both the sleeve 24 and entire bearing assembly 26 will be rotated through a like degree of rotation upon the bearings 36 and 44, and the conduit 12 may be rotated a full 360°, or more, relative to the conduit 14 without imposing destructive forces upon the swivel joint.

It will therefore be appreciated that the swivel joint of the invention provides an initial biasing torque force for relative rotational conduit movement of 20° or less, and yet produces a bearing support permitting complete rotation without overstressing the joint components. The apparatus provides a biasing counter torque at all displacements and the torque forces required to assure sequential operation of the elastic deformation and bearing rotation are accurately regulated by use of the spacers 52. The aforedescribed equipment is of a highly dependable nature capable of maintaining an efficient sealing relationship even though bearing failure occurs.

It is appreciated that various modifications to the inventive concepts may be apparent to those skilled in the art without departing from the spirit and scope of the invention. For instance, the projections 68 and recesses 94 can take many forms, such as defining projections on extension 90 to be received within recesses in a split collar mounted on sleeve 24. Of course, such keying means must permit the relative rotational lost motion desired between sleeve 24 and extension 90, but the exact form of the keying structure is not critical.

We claim:

1. A conduit swivel joint comprising, in combination, a first body having an axial passage, a second body having an axial passage coaxial with said first body passage, conduit attachment means defined on said bodies for attaching conduits thereto in communication with the associated passage, and support means interconnecting said bodies for relative rotative movement about the passage axes thereof comprising a pair of annular axially spaced collars having an elastomeric material bonded thereto, a plurality of annular ring members in axially spaced relationship embedded into said elastomeric material intermediate said collars, said support means permitting limited relative rotative movement by deformation of said elastomer material and including rotational bearing means permitting bearing supported relative rotative movement of said bodies, and torque regulating means mounted upon said first body regulating the torque required to produce bearing supported relative rotative movement of said bodies after the initial rotative deformation of said elastomer material.

2. In a conduit swivel joint as in claim 1, a bearing engaging surface defined on at least one of said collars for engagement with a bearing defined on said first body, said torque regulating means axially positioning said bearing defined on said first body to vary the degree of frictional engagement thereof with said bearing engaging surface.

3. A conduit swivel joint comprising, in combination, a first body having an axial passage, a second body having an axial passage coaxial with said first body passage, conduit attachment means defined on said bodies for attaching conduits thereto in communication with the associated passage, and support means interconnecting said bodies for relative rotative movement about the passage axes thereof, said support means including elastomer means permitting limited relative rotative movement by deformation of said elastomer material and including rotational bearing means permitting bearing supported relative rotative movement of said bodies, torque regulating means mounted upon said first body regulating the torque required to produce bearing supported relative rotative movement of said bodies after the initial rotative deformation of said elastomer material, and intermeshing lost motion keying means defined on said second body and support means to produce positive rotation of said support means relative to said first body upon a predetermined relative angular deflection occuring between said first and second bodies.

4. A conduit swivel joint comprising, in combination, a body having a passage defined therein having an axis, a first rotational bearing surface defined on said body transversely disposed to said axis and concentric thereto, a tubular sleeve having an axial passage coaxial and communicating with said body passage, conduit attachment means defined on said body and sleeve for attachment of conduits in communication with the respective passages thereof, an annular retainer having a central opening releasably mounted upon said body in axial opposed relation to said bearing surface, fastening means releasably mounting said retainer upon said body, a second rotational bearing surface defined on said retainer concentric to said body axis and in axial opposed relation to said first bearing surface, said sleeve extending through said retainer opening, and an elastic sleeve support interposed between said bearing surfaces supporting said sleeve upon said body for relative elastic rotation thereto about said body axis, said sleeve support including an elastomeric material internally deforming to permit limited relative rotation between said body and sleeve under initial torque forces prior to said entire sleeve support rotating relative to both of said bearing surfaces.

5. In a conduit swivel joint as in claim 4, means associated with said retainer adjustably regulating the torque required to rotate said sleeve support relative to both of said bearing surfaces.

6. In a conduit swivel joint as in claim 5 wherein said fastening means comprises threaded bolts extending in a direction substantially parallel to the axis of said body and said means regulating the torque required to rotate said sleeve support comprises spacers determining the axial spacing between said body and retainer and the axial spacing between said first and second bearings.

7. In a conduit swivel joint as in claim 4, said sleeve support including an outwardly radially extending flange defined on said sleeve engaging said first bearing surface and a tubular assembly including a first annular collar fixed relative to said flange, a second annular collar axially spaced from said first collar engaging said second bearing surface, and an elastomer bonded to said collars.

8. In a conduit swivel joint as in claim 7 wherein said second collar includes a tubular extension extending into said retainer opening, and seal means interposed between said extension and said retainer opening.

9. In a conduit swivel joint as in claim 4, keying means defined on said sleeve and sleeve support adapted to directly transfer torque between said sleeve and support upon predetermined rotational displacement of said sleeve about said body axis occuring.

10. In a conduit swivel joint as in claim 9, said keying means including intermeshing spline recesses and spline projections, said spline recesses being of substantially greater dimension than said projections in the circumferential direction to produce a circumferential lost motion permitting elastic deformation in said sleeve support prior to rotation of said sleeve relative to both said first and second bearing surfaces.

* * * * *